United States Patent [19]
Craig et al.

[11] Patent Number: 6,093,750
[45] Date of Patent: Jul. 25, 2000

[54] EXPANDABLE THERMOPLASTIC POLYMER PARTICLES AND METHOD FOR MAKING SAME

[75] Inventors: Thomas Orr Craig, Hyde, United Kingdom; George Bruce Klingensmith, Virginia Beach, Va.

[73] Assignee: Huntsman Corporation, Salt Lake City, Utah

[21] Appl. No.: 09/373,011

[22] Filed: Aug. 11, 1999

Related U.S. Application Data

[60] Division of application No. 09/158,189, Sep. 22, 1998, which is a continuation-in-part of application No. 09/122,512, Jul. 24, 1998.

[60] Provisional application No. 60/056,496, Aug. 20, 1997, provisional application No. 60/055,333, Aug. 12, 1997, and provisional application No. 60/054,472, Aug. 1, 1997.

[51] Int. Cl.⁷ .................................................... C08J 9/18
[52] U.S. Cl. ................................ 521/60; 521/56; 521/78; 521/79
[58] Field of Search ................................ 521/60, 78, 79, 521/56

[56] References Cited

U.S. PATENT DOCUMENTS

| | | | |
|---|---|---|---|
| H1094 | 8/1992 | Gorman | 528/500 |
| 3,026,272 | 3/1962 | Rubens et al. | 521/79 |
| 3,026,273 | 3/1962 | Engels | 521/79 |
| 3,067,147 | 12/1962 | Rubens et al. | 521/79 |
| 3,121,132 | 2/1964 | Del Bene | 521/79 |
| 3,371,053 | 2/1968 | Raskin | 521/56 |
| 3,888,957 | 6/1975 | Netting | 521/56 |
| 4,086,191 | 4/1978 | Hinselman et al. | 260/2.5 B |
| 4,174,427 | 11/1979 | Davis et al. | 521/56 |
| 4,404,293 | 9/1983 | Cigna et al. | 521/56 |
| 4,525,484 | 6/1985 | Hahn et al. | 521/56 |
| 4,560,705 | 12/1985 | Harrison | 521/60 |
| 4,619,845 | 10/1986 | Ayers et al. | 427/422 |
| 4,794,167 | 12/1988 | Lindner et al. | 528/501 |
| 4,813,859 | 3/1989 | Bullard et al. | 425/4 R |
| 4,840,759 | 6/1989 | Arch et al. | 264/53 |
| 4,933,105 | 6/1990 | Fong | 252/303 |
| 5,000,891 | 3/1991 | Green | 264/45.5 |
| 5,228,620 | 7/1993 | Anderson et al. | 239/8 |
| 5,240,657 | 8/1993 | Harclerode et al. | 264/53 |
| 5,269,980 | 12/1993 | Levendis et al. | 264/9 |
| 5,525,637 | 6/1996 | Henn et al. | 521/59 |
| 5,573,790 | 11/1996 | Wehtje et al. | 425/404 |
| 5,582,779 | 12/1996 | Gross et al. | 264/11 |
| 5,591,778 | 1/1997 | Scherzer et al. | 521/56 |
| 5,977,195 | 11/1999 | Craig et al. | 521/78 |

FOREIGN PATENT DOCUMENTS 0564781  10/1993  European Pat. Off. .

*Primary Examiner*—Morton Foelak
*Attorney, Agent, or Firm*—Russell R. Stolle; Ron D. Brown; Christopher J. Whewell

[57] ABSTRACT

An improved process for manufacture of expandable polymer particles is provided. The continuous process disclosed produces expandable polymer pellets in a single step while eliminating many of the dangers inherent in processes of prior art employed for the same. The polymers produced herein are of uniform size, and may be molded into various articles of manufacture using existing equipment and techniques known to those skilled in the art.

25 Claims, 1 Drawing Sheet

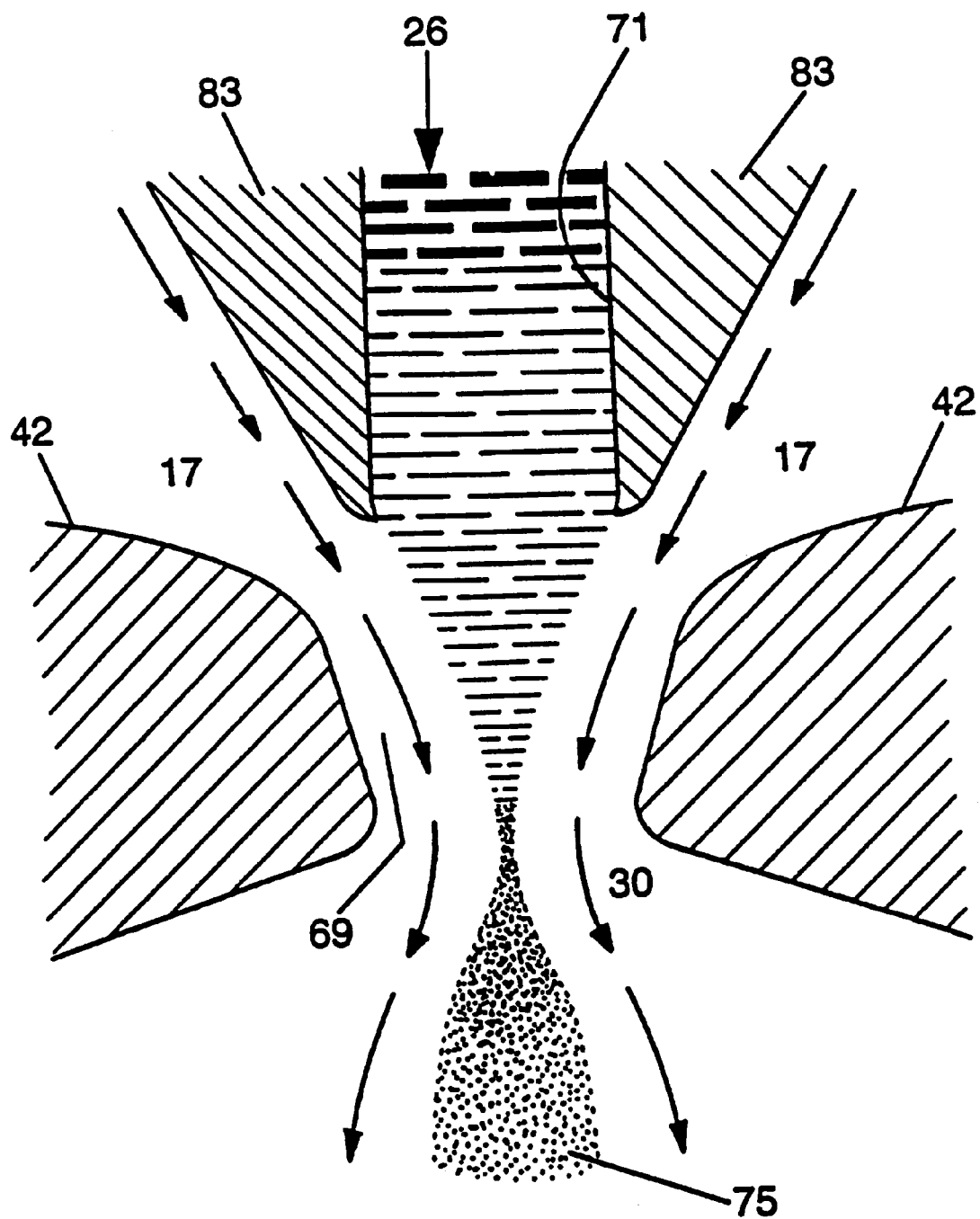

EXPANDABLE THERMOPLASTIC POLYMER PARTICLES AND METHOD FOR MAKING SAME

This Application is a Divisional Application of U.S. non-provisional patent application Ser. No. 09/158,189 filed Sep. 22, 1998, which was a Continuation-in-Part and claims the benefit of U.S. non-Provisional patent application Ser. No. 09/122,512 filed Jul. 24, 1998 which is currently still pending, and in which was claimed benefit of Provisional Application No. 60/056,496 filed Aug. 20, 1997; U.S. Provisional Application No. 60/055,333 filed Aug. 12, 1997; and U.S. Provisional Application No. 60/054,472 filed on Aug. 1, 1997. The entire contents of these patent applications are herein incorporated by reference.

This invention concerns a novel method for producing expandable thermoplastic particles. More particularly, the invention relates to expandable polymer particles that may be advantageously produced utilizing an atomization technique. Expansion and fusion of the particles so produced may be conducted using means well-known to those skilled in the art of expandable polymers in order to form various molded products from the particles.

BACKGROUND

The prior art provides methods for manufacturing expandable thermoplastic polymeric materials, including both crystalline and amorphous polymers. Production of expandable thermoplastic materials made from crystalline polymers is effected by heat plastifying a normally-solid polymer resin, admixing such heat plastified resin with a volatile blowing agent under heat and pressure to form a flowable gel, and thereafter extruding the gel into a zone of lower pressure and temperature to expand and cool the gel to form the desired solid polymeric foam product. 1,2-dichlorotetrafluoroethane has been widely used as such a blowing agent owing to the sufficient degree of dimensional stability it confers to masses of foamed products during the curing period. However, the obtention of success with other blowing agents such as hydrocarbons including alkanes such as pentane has recently been realized owing to the use of stability control agents such as those long-chain fatty acid/polyol partial esters described in U.S. Pat. No. 3,644,230 and the esters of high fatty acids detailed in U.S. Pat. Nos. 4,214,054 and 4,395,510, the entire contents of all of which are herein incorporated by reference. Therefore, the production of a wide variety of expandable thermoplastics comprising even crystalline polymers is now possible using conventional techniques. In known processes, a blowing agent is compounded into the starting polymer resin blend in proportions to make the desired degree of expansion in the resulting foamed cellular product, usually up to about a 60-fold volume expansion to produce products having aged foam densities down to about 9.6 kg/m$^3$ (about 0.6 pounds per cubic foot). The expandable compositions may be prepared by heat plastifying an olefin polymer resin and mixing the resin with a stability control agent and a blowing agent, and finally activating the blowing agent to expand the mixture. Typical processes for producing such materials are outlined in U.S. Pat. Nos. 4,694,027; 4,894,395; 5,304,580; and 5,605,937, the entire contents of which are herein incorporated by reference thereto. However, the known means for producing expandable thermoplastic materials produce particles having less than optimal properties. An example of this is that expandable polyolefin particles such as polyethylene must be pre-expanded prior to impregnation with blowing agent, and such pre-expansion requirement is well-known to those skilled in this art. This necessary pre-expansion equates with a proportional increase the warehousing space required to store the finished expandable particles. Additionally, the shelf life of pre-expanded thermoplastic expandable materials made from normally-crystalline polymers is well-known by those skilled in this art to be far less than desirable.

Production of expandable compositions comprising amorphous polymers, on the other hand, such as polystyrene materials, include a commonly-used batch process wherein raw materials including an aqueous suspension containing styrene monomer, a surfactant, catalyst, and other additives are processed by well-known means under conditions of vigorous agitation to yield spherical polystyrene beads having diameters in the range of about 0.3 to 1.5 millimeters. Such beads are subsequently impregnated with a hydrocarbon or other blowing agent, typically pentane or halogenated hydrocarbons, by charging approximately one hundred parts (by weight) of polymer particles, one hundred parts water, and one part of a concentrated surfactant (or a mixture thereof, such as a mixture of an arylalkyl polyether alcohol and dodecyl benzene sulfonate) into an autoclave along with about three to ten parts of pentane. The mixture is heated to about 170 degrees Fahrenheit under pressure for 3 hours and cooled to room temperature to yield expandable polystyrene beads which are subsequently rinsed, dried, and stored for later use. Generally, in such a batch system, the size of the beads can be controlled by advantageously selecting the processing conditions, including: time, agitation, temperature, pressure, and reactant concentration. However, this process for producing expandable polystyrene beads is not without several inherent disadvantages, one being that large volumes of water are required to suspend the polystyrene beads during both the polymerization and the impregnation steps. This in reality is a two-fold disadvantage. First of all, the heat energy input to the water to bring it to the required temperature is forfeit at the end of the impregnation when the water is discharged to the environment. Secondly, prior to such discharge the water must be treated, at additional expense, in order to meet the strict regulatory requirements imposed by various governmental entities. These combined energy and treatment costs are a significant portion of the cost of expandable polystyrene which is passed on to the end-users of the polystyrene.

Another disadvantage is that the stirred tank reactors in which the suspension is reacted are vulnerable to a multiplicity of events which can cause the reactor agitator to cease in its motion, including power and equipment failures. Such failures represent potential catastrophic occurrences in that coalescence of monomer droplets may lead to formation of a single, large, reactive mass of material undergoing an uncontrollable, strongly exothermic reaction owing to the lack of effective means for heat removal in such instances. In addition to fouling of equipment, such a scenario represents a significant safety hazard.

Expandable thermoplastic polymeric materials, including both those prepared from both crystalline and amorphous materials in accordance with the foregoing containing volatile agents are known to be expandable by application of heat under conditions which permit the volatile agent to be vaporized and form large numbers of cells within the bulk of the polymeric material. (U.S. Pat. Nos. 4,174,427; 5,000,891; 5,240,657; 5,525,637; and 5,573,790, the contents of which are herein incorporated by reference, are descriptive thereof) When heating of expandable thermoplastic materials is performed within the confines of a suitable mold, various articles of manufacture may be produced using the expandable polymeric materials mentioned, regardless of whether the materials exist in the form of pellets or beads. It is towards alternative means for preparing expandable crystalline and amorphous particles, including polyolefin and polystyrene beads, in avoidance of the disadvantages associated with the prior art processes and properties described above which the instant invention is concerned. The instant invention also relates to a means for producing expandable polymeric particles of reasonable uniformity in size, to reduce and even preclude the necessity for multi-step particle size classification of the spheroids. The spheroid particles produced in the present invention may contain various additives which include but are not limited to: flame retardants, nucleating agents, and other chemical species which are known to impart desirable properties to polymers. Such other chemical species are well-known to those of ordinary skill in the art.

SUMMARY OF THE INVENTION

The present invention provides continuous processes for producing expandable thermoplastic spheroidal particles and, which is applicable to both crystalline polymers such as polyolefins and amorphous polymers such as polystyrene. In the case of expandable polyolefins, such materials produced in accordance herewith contain more gaseous blowing agent than those materials made using a prior art method. In the case of amorphous polystyrenics, the production of such is free from the hazards associated with potential formation of a large mass of exothermally reactive material, as well as the pendant costs for treatment of large volumes of water in pursuance of satisfaction of environmental or other regulatory standards.

The processes of this invention comprises providing a molten mixture including a thermoplastic polymer and at least one blowing agent, and forming particles from the thermoplastic polymer. The particles formed are immediately and rapidly thermally quenched in order to hold in place within the solid matrix the blowing agent which was dispersed throughout the polymer melt. In one method, a technique involving atomization of the blowing agent-laden thermoplastic is advantageously conducted to effect a deep thermodynamic quench of the nascent particles in order to lock the blowing agent within the particle matrix. Such formation of particles avoids the difficulties of blowing gas rejection normally associated with polymer crystallization, since the cooling is effected more rapidly than possible using other prior art methods. According to this invention, polymers such as isotactic polypropylene and polyethylene, are quenched by virtue of adiabatic cooling which takes place immediately following formation of the particles in an atomization nozzle as elsewhere described herein. Alternatively, an extrusion technique in which the fluid polymer mass is immediately quenched in a liquid cooling bath as it emerges from a die in the form of extrudate may be employed to form particles from thermoplastic polymers in which the liquid cooling bath is selected from cold water, liquid nitrogen, or liquid helium, and the process is similar in fashion as those used to produce lead shot or jeweler's casting granules. This process may be carried out preferably, though not necessarily, in a controlled atmosphere containing the blowing agent under pressure. Under such conditions, it is possible to substantially delay or inhibit the rate of crystallization of the thermoplastic which otherwise occurs nearly instantaneously when normally-crystalline materials are employed. Pellets may be formed by the action of a cutting surface acting on an extrudate emerging from the die of a conventional polymer extruder, and such pellets fall within the meaning of the word "particles" as used in this specification and the claims appended hereto. In the case of normally-crystalline materials, rapid cooling of the polymer under conditions which inhibit or delay the rate of crystallization of polymer substantially restricts the ability of a gaseous blowing agent to diffuse out from the bulk of the particles upon cooling. Thus, the blowing agent becomes and remains entrapped within the particle. This concept is the common thread shared by the methods herein disclosed.

The most preferred method for forming particles is to deliver the molten mixture containing a blowing agent to an atomizing nozzle under conditions sufficient to cause atomization of the molten mixture so as to form droplets comprising the molten mixture, and effecting sufficient simultaneous cooling of the droplets to form polymer particles having the blowing agent entrapped therein. The particles are then collected for later use. This method is applicable to both crystalline and amorphous polymers.

In one preferred embodiment, expandable polystyrene spheroids may be produced by first providing a stream or a reservoir of a molten polymer mass which contains at least one blowing agent in an evenly distributed form under conditions of temperature and pressure sufficient to ensure that a gas phase does not exist in the molten mass. An atomization nozzle is also provided in fluid contact with the molten mass. The molten material from the polymer stream or reservoir is transferred through an orifice in the nozzle to a region of pressure less than that present in the reservoir or stream. The change in pressure encountered, coupled with the physical configuration of the nozzle and the action of the atomizing gas results in atomization of the molten polymer containing the blowing agent evenly distributed throughout its bulk. The Joule/Thompson cooling attendant to the expansion of the atomizing gas accompanying the atomization, along with any external cooling optionally applied causes the molten polymer to form spheroids containing the blowing agent evenly dispersed therein. Following collection, the spheroids are suitable for use in molding various articles of manufacture using techniques known to those of ordinary skill in the art.

BRIEF DESCRIPTION OF THE DRAWING

The drawing is a cutaway view of an atomizing nozzle useful for producing expandable thermoplastic polymer particles according to the invention.

DETAILED DESCRIPTION OF PREFERRED EMBODIMENTS

The present invention is a process for producing expandable thermoplastic particles from a polymer melt that contains at least one blowing agent. Particles are produced from this melt using either an extrusion technique in combination with a rapid cooling means, or, as is most preferable, by an atomization process which inherently comprises adiabatic cooling or external cooling. The particles produced are spheroids that may be later used in a molding process well-known to those of ordinary skill in this art. Typically, the polymeric spheroid particles comprise polypropylene, polyethylene, or polystyrene.

The preferred method for forming expandable thermoplastic particles according to this invention is that wherein a molten stream of polymer containing a blowing agent is fed into an atomizing nozzle under conditions sufficient to cause the rapid formation of particles, and simultaneous or immediate subsequent rapid cooling thereof. Utilizing this method, particles may be formed from crystalline polymers such as polypropylene and polyethylene, and amorphous polymers such as polystyrene.

In another method according to the invention, an extrusion technique is employed to form particles from the mixture, including but not being limited to the direction of a stream of molten thermoplastic material into a quench bath such as cold water, liquid nitrogen, or liquid helium in similar fashion as lead shot or jeweler's casting granules are produced, the whole of the quenching being carried out preferably in a controlled atmosphere containing the blowing agent under pressure. Preferably, the pressure within the controlled atmosphere is sufficient to substantially reduce any tendency of the blowing agent to become separated from the molten mass. Under such conditions of rapid cooling, which may mean that the polymer goes from 250 degrees centigrade to minus 78 degrees Centigrade in less than 1 second, it is possible to substantially delay or inhibit the rate of crystallization of the thermoplastic which otherwise occurs upon solidification of polymers which are generally known to be crystalline under normal conditions. Pellets or barrel shaped chunks of polymer formed by the action of a cutting surface acting on an extrudate emerging from the die of a polymer extruder fall within the meaning of the word "particles" as used in this specification and the claims appended hereto. Such particle fabrication may be carried out using water as a cooling medium in contact with the extrudate, or using other liquid materials such as liquid nitrogen, liquid helium, or a cold pool of metallic mercury. While the inventors hereof do not wish to be bound by any particular theory, it is suspected that the rapid cooling of the polymer under conditions which inhibit or delay the rate of crystallization of polymer substantially restricts the ability of a gaseous blowing agent to diffuse out from the bulk of the particles upon cooling. Thus, the blowing agent is trapped within the particle, and it remains entrapped even after the normal subsequent crystallization of the polymer in the particle. Such normal subsequent crystallization of the polymer in the particle occurs by virtue of the polymer increasing in temperature from the quench temperature to ambient temperature.

The crystallinity of polymers is often measured by their intrinsic property known as the heat of fusion, which may be conveniently measured by test methods ASTM D-3417 or ASTM E-793-85. In general, for thermoplastic polymers the amount of crystallinity measured in a given sample of commercial grade material is only a fraction of the value for purely isotactic material. This is because of the many manufacturing variables which influence the total amount of crystallinity in a given sample of material, with the net result being that the amount of crystalline material present in materials often considered as highly crystalline is only on the order of 40–60%. Therefore, the heat of fusion of a given sample is only a fraction of that observed in the pure material. Accordingly, each sample of polymer has associated with it a characteristic heat of fusion value which is a direct indication of the amount of crystallinity present in the sample. In order for the present invention to function in its intended utility, the crystallinity of freshly-prepared (less than 1 minute old) expandable pellets must be lower than 90% of the crystallinity of the polymer prior to its being rendered molten and injected or otherwise mixed with blowing agent. This reduced crystallinity is the result of the molten polymer stream having been rapidly cooled according to the teachings herein, and is a direct indication of the effective inhibition or delay of the crystallization of the polymer. Of course, eventually, after storage and especially storage at room temperature of the pellets produced according to this invention, the crystallinity of the pellets shall increase to the normally observed value (after correcting for the presence of the blowing agent) for the polymer in question. However, such crystallization does not have the same detrimental effect on the loading of the gaseous blowing agent in the polymer as it would have in the event that the polymer had been permitted to fully crystallize as it passed from molten to solid state, as per its natural tendency, owing to the gaseous blowing agent being effectively trapped within the bulk of the pellet. Such reasoning is inapplicable to amorphous polymers, which retain gaseous blowing agents well upon solidification.

Blowing agents are generally well-known to those of ordinary skill in the polymer art. A blowing agent employed herein may include any of those well-known in the foamed polymer art as being useful for this purpose including, but not limited to gases including: hydrocarbons, nitrogen, carbon dioxide, halogenated hydrocarbons, fluorinated hydrocarbons, chlorocarbons, chlorofluorocarbons. Solid substances such as azodicarbonamide and other well-known compounds which similarly evolve gases suitable for use as blowing agents in polymers when subjected to thermal energy are also herein indicated as being suitable blowing agents for inclusion in the polymer melt. Preferably, though, for purposes of the instant invention, the blowing agent comprises n-pentane, butane, or isobutane. Most preferably the blowing agent comprises n-pentane. Preferably, the amount of blowing agent present in the melt is between about 0.5 and 7.0 percent by weight, and when n-pentane is selected as the blowing agent it is present at an amount of between 1.0% and 10% and most preferably 5.0% by weight of the total polymer mass. The molten polymer stream is maintained under conditions of temperature and pressure such that no gaseous pentane is present, and the blowing agent is evenly distributed within the polymer stream melt. Any of various means for agitation, as are well-known to those of ordinary skill, may be employed to promote uniformity of the dispersion of blowing agent in the melt.

The atomizing nozzle to which the polymer stream laden with blowing agent is fed may be of various configurations provided that the polymer stream is sufficiently atomized that particles in the size range of about 0.3 to 1.5 millimeters are formed upon the cooling of the atomized polymer.

The most preferred nozzles for use in atomizing polymer melts according to this invention are those which employ impingement of a gas stream on a stream or film of molten polymer in order to atomize the stream or film. Examples of such gas atomization nozzles are disclosed in U.S. Pat. Nos. 4,619,845 and 5,228,620, the entire contents of which are herein incorporated by reference. Referring to the drawing there is shown a cutaway view of a schematic of an atomizing nozzle useful for preparing particles of expandable polymers according to the present invention. In this figure, 75 represents the polymer particle product. 83 represents a co-extensive construction in which is contained a tubular conduit 71 through which the molten polymer stream 26 is conveyed to atomizing zone 69. 42 is a construction which defines the orifice through which the atomizing gas and molten polymer stream pass. On passing through the orifice the molten polymer stream is caused to be atomized by virtue of the interaction of the high velocity atomizing gas 17 interacting with the molten polymer stream. The atomizing gas 17 is fed in under high pressure at a sub-sonic rate into the atomizing nozzle where it acts upon the molten polymer stream thus causing the latter to be atomized. The portion 30 from which the atomized particles emerge is a region of lower pressure, preferably atmospheric. Accompanying the drop in pressure experienced by atomizing gas 17 is adiabatic cooling of both the atomizing gas and the polymer particles. Since molten polymer stream 26 contains a blowing agent, such cooling of the particles ensures that the blowing agent is encapsulated within the product particles 75 themselves.

Adiabatic cooling or Joule-Thompson cooling is a well-known phenomena to those skilled in the art of physical chemistry, and detailed mathematical and practical descriptions thereof are set forth in the book entitled "Physical Chemistry", written by Peter W. Atkins, $3^{rd}$ ed. and published by W. H. Freeman and Company, New York, 1985 (ISBN-0-7167-1749-2), the entire contents of which are herein incorporated by reference thereto.

Principles of atomization are detailed in the book entitled "Fluid Flow Phenomena in Metals Processing" by J. Szekely, published by Academic Press, New York City, N.Y. (1979), pp 340 et seq., the entire contents of which are herein incorporated by reference. Other suitable atomization apparatus for the process according to the invention may include, for example, rotary atomization discs or plates, single material and multi-material nozzles with or without auxiliary supply of energy (e.g., mechanical vibration) and mixing nozzles with internal or external mixing. Another nozzle anticipated as being useful herein is the one set forth and described in an article appearing in "Materials World" magazine, Vol. 5, No. 7 (July 1997), pages 383 et seq. (the entire contents of which are herein incorporated by reference).

Another requisite for making polymer particles in accordance with this invention is the supplying of a stream of molten polymer liquid into the atomization apparatus described above. This may be accomplished by free inflow from a pressurized container or by means of suitable pumps, extruders, or other melt-conveying devices known in the art. The combination of temperature and pressure required to deliver the polymer melt to the atomizing nozzle at a desired flow rate can be readily calculated from the temperature-viscosity dependence data for the polymer or polymer blend employed. Preferably, the pressure inside the conduits is greater than atmospheric pressure and is most preferably about 200 psig. Preferably, the temperature of the polymer melt is at least ten (10) degrees centigrade above the melting point or glass transition point of the polymer. When the polymer used is polystyrene, the preferable temperature of the melt is 180 degrees centigrade using 5.0% pentane in the melt.

Once the liquid stream comprising the polymer melt is supplied to the atomizing nozzle, atomization occurs by virtue of the interaction of the atomizing gas with the polymer melt and the simultaneous change in pressure it experiences. Preferably, the pressure outside the nozzle is atmospheric pressure; however, pressures other than atmospheric may be used provided that the difference between that experienced by the polymer melt and the external pressure is at least 5 psig. The diameter of the particles produced is preferably between about 0.3 to 1.5 millimeters. The preferred size of the particles varies according to the final application in which their employ is desired, with 1.0 mm diameter being typical.

Additionally, sufficient cooling for rendering the nascent polymer particles exiting the atomization nozzle is employed in order to suppress gas generation from the blowing agent during the stage in which the polymer spheroids are formed, in order that no appreciable net expansion of the particles occurs, and to promote retention of the blowing agent within the solidified particles themselves.

EXAMPLE 1

A continuous mass polymerization plant producing molten polystyrene at 8000 kg/hr is arranged so that a sidestream of molten polymer can be taken from the plant output stream at a rate of 50 kg/hr using a gear pump. The gear pump delivers the polymer to a static mixer equipped with an injector device through which a volatile substance such as pentane at 5.0% (by weight based on the polymer weight) can be admitted to the molten polymer and dissolved therein. The polymer exiting the static mixer is maintained at a temperature of 210 degrees centigrade by heat transfer oil circulating in a jacket surrounding the static mixer. The polymer passes from the static mixer into the throat of a cooling extruder that cools the molten polymer to 170 degrees centigrade. The polymer exiting the extruder passes to an atomizing diehead comprising a heated vertical pour tube having an internal diameter of 10 mm. The molten polymer emerges as a free-falling strand from the lower end of the pour tube and is impinged upon and atomized by a stream of nitrogen gas. The atomizing stream of nitrogen gas is delivered at a pressure of 17 bar through a plurality of orifices arranged in a circular array having the of the pour tube as the center of the circular array. The stream of nitrogen from each orifice impinges on the polymer at an angle of 15 degrees with respect to the axis of the polymer stream which in this case is vertical. Within each nitrogen delivery conduit is a resonant cavity which creates a 50 kHz pressure and velocity oscillation in the nitrogen gas stream. The flow rate of nitrogen is set at 5 cubic meters per hour calculated at standard temperature and pressure. The pentane-laden polymer is atomized by the impinging gas to the form of spheroidal particles having a mean diameter of 1.0 mm. Samples of these particles are heated in boiling water and are thereby expanded to provide low-density foamed polystyrene particles having a closed-cell structure, thus demonstrating that an effective amount of pentane is retained within the nascent polymer particles created by the atomization to cause expansion of the particles. Larger quantities of the particles on the order of 100 kilogram lots are pre-expanded by exposure to steam in a pre-expander of the type conventionally used in the manufacture of expandable polystyrene from suspension-polymerized gas-impregnated polymer beads. The expanded beads are left to mature for 5 hours, and then molded to produce insulation boards having a density of 40 kg/Cu meter and a thermal conductivity of 0.03 watts per meter per degree centigrade.

Although the invention has been shown and described with respect to certain preferred embodiments, it is obvious that equivalent alterations and modifications will occur to others skilled in the art upon reading and understanding of this specification and the appended claims. The present invention includes all such modifications and alterations, and is limited only by the scope of the following claims.

We claim:

1. A polymer product produced by a process for producing expandable thermoplastic particles which comprises:
    a) providing a molten mixture which includes a thermoplastic polymer and a blowing agent;
    b) providing an atomizing gas;
    c) delivering said molten mixture and said atomizing gas to an atomizing nozzle under conditions sufficient to cause atomization of said molten mixture and formation of droplets comprising said molten mixture;
    d) cooling of said droplets to form solid polymer particles; and
    e) collecting the particles.

2. A polymer product produced by the process according to claim 1 wherein the amount of said blowing agent contained within said particles is an amount effective to cause said particles to expand to about two times of their original diameter upon being subjected to temperatures above 95 degrees Centigrade.

3. A polymer product produced by the process according to claim 1 wherein the steps of forming particles and cooling are both effected in less than 1 second.

4. A polymer product produced by the process according to claim 1 wherein said cooling of said particles is effected to an effectively low temperature at an effective rate to substantially inhibit the crystallization of the polymer to produce a material having less than 90% of the crystallinity normally observed for the polymer.

5. A polymer product produced by the process according to claim 1 wherein said particles are spheroids having a size in the range of between about 0.3 mm and 1.5 mm.

6. A polymer product produced by the process according to claim 1 wherein an atomizing gas is fed to said atomizing nozzle.

7. A polymer product produced by the process according to claim 6 wherein said atomizing gas is selected from the group consisting of: noble gases, nitrogen, oxygen air, and carbon dioxide.

8. A polymer product produced by the process according to claim 6 wherein the blowing agent is used as the atomizing gas.

9. A polymer product produced by the process according to claim 6 wherein said blowing agent is selected from the group consisting of: hydrocarbons, chlorohydrocarbons, chlorofluorohydrocarbons, carbon dioxide, nitrogen, and air.

10. A polymer product produced by the process according to claim 6 wherein said blowing agent is azodicarbonamide.

11. A polymer product produced by the process according to claim 6 wherein said blowing agent is selected from the group consisting of pentane and isobutane.

12. A polymer product produced by the process according to claim 6 wherein said thermoplastic polymer comprises a polymer selected from the group consisting of: polystyrene, polyethylene, and polypropylene or combinations thereof.

13. A polymer product produced by the process according to claim 6 wherein the thermoplastic polymer includes $C_2$–$C_4$ copolymers of ethylene, propylene, and styrene, or combinations thereof.

14. A polymer product produced by the process according to claim 6 wherein the thermoplastic polymer includes a normally-crystalline polymeric material.

15. A polymer product produced by the process according to claim 6 wherein the thermoplastic polymer includes a substantially-amorphous polymeric material.

16. A polymer product produced by the process according to claim 6 wherein said cooling is effected by virtue of expansion of the atomizing gas.

17. A polymer product produced by the process according to claim 16 wherein the molten thermoplastic particles are cooled to a temperature below 25 degrees Centigrade at a rate sufficient to inhibit the crystallization of crystalline polymeric material to less than 90% of the crystallinity normally observed for the polymer.

18. A polymer product produced by the process according to claim 17 wherein the thermoplastic beads are cooled below 25 degrees Centigrade and then slowly permitted to reach 25 degrees Centigrade.

19. A polymer product produced by the process according to claim 16 wherein said expansion is essentially adiabatic.

20. A polymer product produced by the process according to claim 6 wherein the temperature of said molten mixture is between about 40 degrees centigrade and 300 degrees centigrade.

21. A polymer product produced by the process according to claim 6 wherein the pressure experienced by said molten mixture is greater than atmospheric pressure.

22. A polymer product produced by the process according to claim 6 wherein the concentration of said blowing agent in said polymer melt is between about 0.5% and 7.0% by weight of the total polymer melt weight.

23. A polymer product produced by the process according to claim 6 wherein said atomizing gas includes a reactive species which is capable of functionalizing the polymer.

24. A polymer product produced by the process according to claim 23 wherein said reactive species is selected from the group consisting of: halogens, hydrogen halides, interhalogen compounds, nitrogen oxides, ozone, maleic acid anhydride, amines, oxygen, sulfur trioxide, and air.

25. A polymer product produced by the process according to claim 6 wherein the difference in pressure experienced by the polymer melt and the pressure outside of said atomizing nozzle is greater than 5 psig.

* * * * *